May 24, 1960     R. A. WHITLOCK, JR     2,937,753
CONTROL SYSTEM FOR WATER TREATMENT APPARATUS
Filed Sept. 19, 1956     2 Sheets-Sheet 1
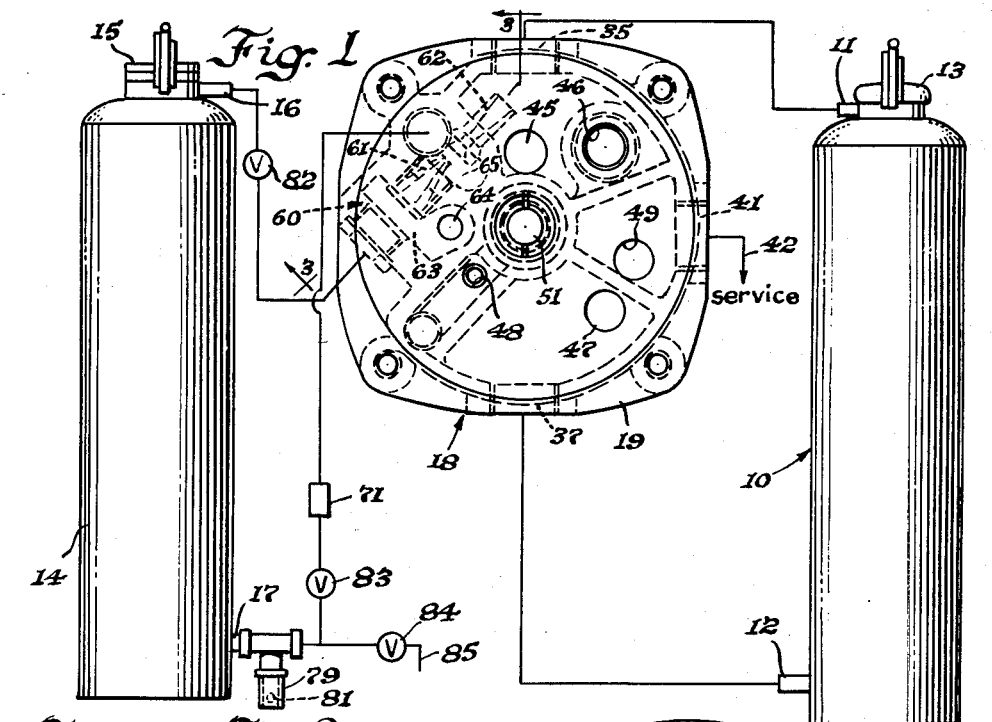
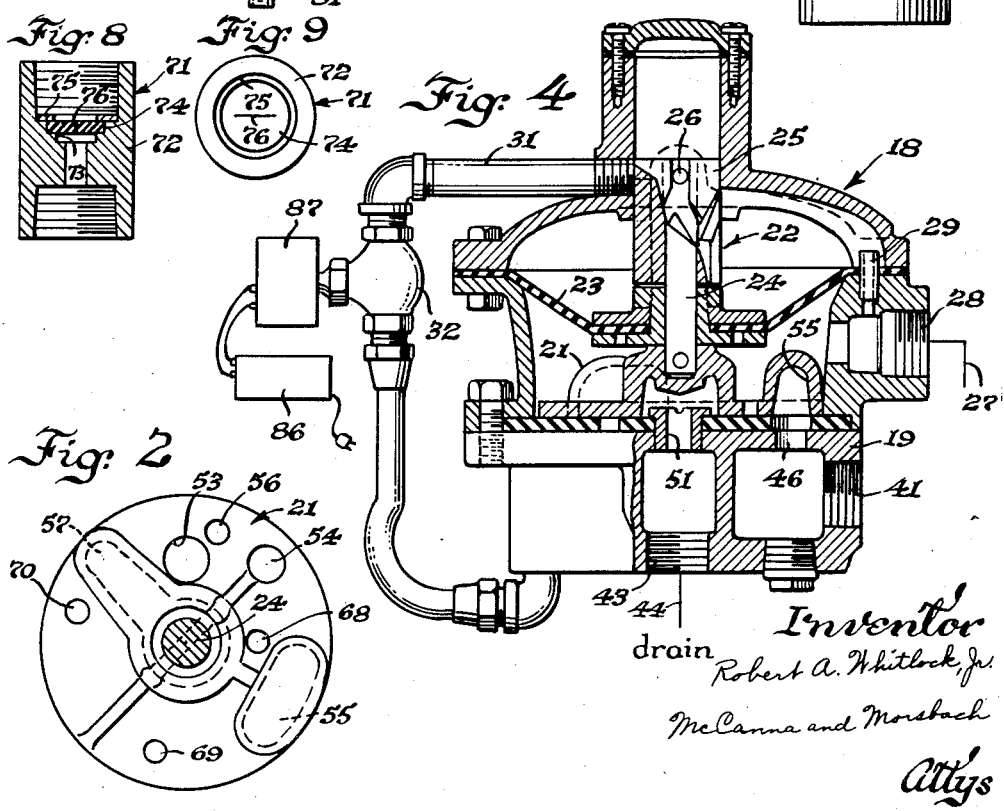

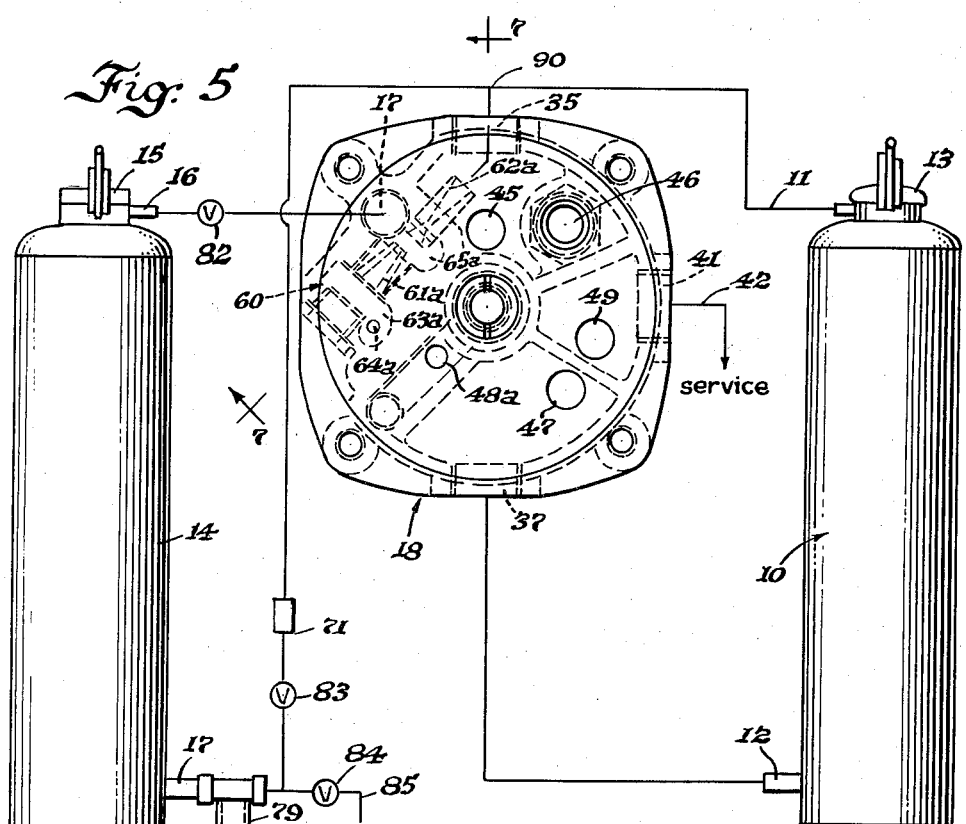
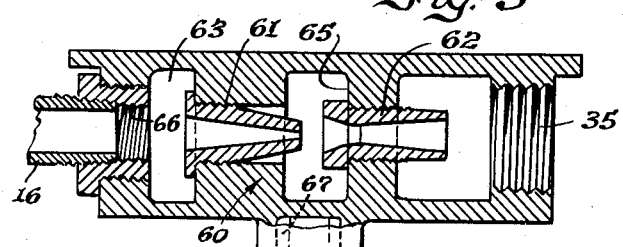
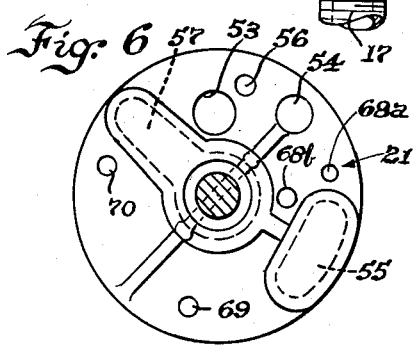
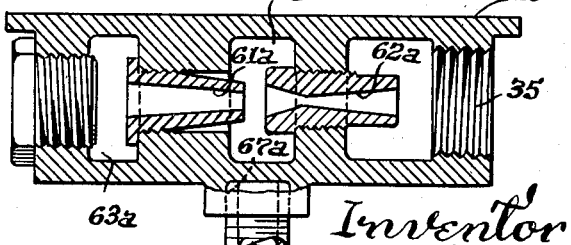

United States Patent Office 2,937,753
Patented May 24, 1960

2,937,753
CONTROL SYSTEM FOR WATER TREATMENT APPARATUS

Robert A. Whitlock, Jr., Rockford, Ill., assignor to Aqua Matic Inc., Rockford, Ill., a corporation of Illinois Filed Sept. 19, 1956, Ser. No. 610,798

9 Claims. (Cl. 210—105)

This invention relates to water treatment apparatus and more particularly to an improved control system adapted for use in a treatment apparatus employing a pressurized brine tank.

An important object of this invention is to provide a control system for a water treatment apparatus including a pressurized brine tank, which control system includes a single multiport valve operable to control the various flows of water and brine to and from the brine tank and treatment tank and which does not require additional shut-off valves in the lines leading to and from the brine tank to prevent the passage of brine during service.

Another object of this invention is to provide a control system in accordance with the foregoing object which prevents flow of saturated brine from the pressurized brine tank into the service line, due to the expansion and contraction of the fluid in the brine tank in response to changes in pressure in the supply line.

A more particular object of this invention is to provide an improved control system for a water treatment apparatus having a pressurized brine tank, which control system includes a flow proportioning device providing continuous liquid communication between the raw water inlet and brine outlet of the brine tank and a multiport valve operative in the brine position thereof to effect flow through the proportioning apparatus in a direction to draw brine from the brine tank and pass the brine to the treatment tank, and operative in the other positions thereof to prevent flow through the proportioning apparatus and thereby substantially equalize the pressures at the water inlet and brine outlet of the brine tank whereby to prevent the flow of brine through the brine tank when the valve is not in its brining position.

These, together with various ancillary objects and advantages of this invention will be more readily appreciated as the same becomes better understood by reference to the following detailed description when taken in connection with the accompanying drawings wherein:

Figure 1 is a diagrammatic view of one form of control system and illustrating the port and passage arrangement in the stator of the multiport valve;

Fig. 2 is a plan view of the rotor adapted for use with the valve of Fig. 1;

Fig. 3 is a fragmentary sectional view through the ported stator of Fig. 1, and taken on the plane 3—3 of Fig. 1;

Fig. 4 is a partial vertical sectional view through the valve;

Fig. 5 is a schematic diagram illustrating a modified form of control system;

Fig. 6 is a plan view of the rotor for use with the valve of Fig. 5;

Fig. 7 is a fragmentary sectional view taken on the plane 7—7 of Fig. 5;

Fig. 8 is a longitudinal sectional view through the brine check valve; and

Fig. 9 is an end elevational view of the brine check valve.

The control system of the present invention is adapted to establish the various flows of fluid to and from a treatment tank designated generally by the numeral 10, which treatment tank, as is conventional, contains a bed of exchange material and has a raw water inlet line 11 communicating therewith adjacent one end and a treated water outlet line 12 adjacent its other end. A removable closure 13 is provided to permit filling of the tank with exchange material.

In the present apparatus, the regenerating material such as salt, used in the periodic regeneration of exchange material in the tank 10, is contained in a separate sealed tank 14. The tank 14, as is conventional, has a removable closure 15 adapted to seal the filler opening therein and permit maintaining the fluid in the tank under pressure. Fluid conduits 16 and 17 are provided in the tank and respectively communicate with the tank adjacent the upper end thereof and at a point spaced below the upper end of the tank to pass water under pressure into the tank and to convey the saturated brine from the tank.

In accordance with the present invention, the apparatus for controlling the various flows of fluid to and from the brine tank 14 and treatment tank 10 is embodied in a single multiport valve designated generally by the numeral 18. In general, the valve includes a stator 19, a rotor 21 and an operating mechanism, generally indicated by the numeral 22, for selectively turning the rotor between its service, backwash, brining and rinse positions.

The operating mechanism for turning the rotor between its various rotative settings may be of any suitable construction. The rotor operating mechanism herein illustrated is of the lift-turn type disclosed in the copending application of Paul G. Bird, Patent No. 2,833,309, issued May 6, 1958, and assigned to the assignee of the present invention. Briefly, the operating mechanism for the rotor includes a diaphragm 23 non-slidably and rotatably connected to the stem 24 on the rotor and arranged to lift the stem and rotor when the pressure at the underside of the diaphragm exceeds the pressure at the upper side thereof and to return the rotor to its seated position when the pressure at the upper side of the diaphragm is equal to, or greater than, the pressure at the underside thereof. A cam 25 and follower 26 are provided on the stem and bonnet of the valve to turn the rotor from one position to the next succeeding position in response to raising and lowering of the stem. A fluid supply line 27 is connected to the raw water inlet passage 28 and communicates with the underside of the diaphragm 23. A restricted passage 29 communicates with the inlet passage 28 and with the chamber above the diaphragm 23 to supply fluid at line pressure to the upper side of the diaphragm. A drain conduit 31 also communicates with the chamber at the upper side of the diaphragm and has a valve 32 therein adapted, upon opening, to pass the fluid in the chamber above the diaphragm to drain at a rate faster than the rate of flow through the restricted passage 29 to thereby reduce the pressure at the upper side of the diaphragm and raise the rotor. When the drain valve 32 is closed, the fluid enters the chamber above the diaphragm through the passage 29 thereby equalizing the pressures at opposite sides of the diaphragm and effecting reseating of the rotor. Cam 25 is operative during raising and lowering of the rotor, to turn the rotor from one position to the next succeeding position. While a specific form of valve operating mechanism is herein disclosed and described, it is apparent that various other operating mechanisms may be employed for turning the rotor between successive positions and that the rotor may, if desired, be manually operated.

The stator 19 includes a passage 35 which is connected to the raw water inlet line 11 of the treatment tank 10 and a passage 37 connected to the treated water outlet line 12 of the treatment tank. A passage 41 in the stator is connected to the service line 42 and a central drain passage 43 (see Fig. 4) is connected to a drain line 44. The face of the stator has a plurality of ports communicating with the various passages in the stator and the rotor 21 is provided with a plurality of ports and passages adapted to register with the ports in the stator, in the different rotative positions of the rotor, to establish the different flows to and from the treatment tank 10. In the specific valve illustrated, a pair of ports 45 and 46 are provided in the stator and communicate with the passage 35 leading to the raw water inlet line of the treatment tank, and a pair of ports 47 and 48 in the stator are arranged for communication with the passage 37 leading to the treated water outlet line. A port 49 communicates with the service passage 41, and a central drain port 51 communicates with the central drain passage 43.

The rotor 21, illustrated in Fig. 2, includes a pair of angularly spaced ports 53 and 54 adapted to register with the ports 45 and 46 in the stator when the rotor is in its service position to pass raw water from the supply passage 28 to the raw water inlet line 11 of the treatment tank. A circumferentially extending chambered passage 55 is provided in the rotor and arranged to communicate the ports 47 and 49 in the stator with each other, when the rotor is in its service position, to thereby pass the treated water from the tank 10 to service. The rotor is arranged to be rotated in a clockwise direction through approximately 90° to its backwash position. In this position, the port 54 in the rotor communicates with the port 47 in the stator and passes water from the supply line through the line 12 into the bottom of the treatment tank to flow upwardly therethrough and effect backwashing of the exchange material. A radially extending chambered passage 57 is provided on the rotor and arranged to communicate the central drain port 51 with the port 46 in the stator, when the rotor is in its backwash position, to thereby pass the effluent from the top of the treatment tank to drain. A port 56 is provided in the rotor to pass untreated water to service during the backwash phase of the regeneration cycle. In the backwash position of the rotor, all of the other ports in the stator are blocked so that no flow occurs therethrough.

A fluid proportioning apparatus indicated generally by the numeral 60 (see Figs. 1 and 3) is provided in the stator and arranged for connection to the brine tank to pass raw water to the brine tank when the rotor is in its brine position and to mix raw water with the saturated brine flowing from the brine tank and pass the mixed brine and water solution to the treatment tank 10. In general, the flow proportioning apparatus, as shown in Fig. 3, includes an inlet passage 61 and a discharge passage 62. An inlet chamber 63 is formed in the stator adjacent one end of the inlet passage 61 and communicates with a port 64 in the face of the stator (see Fig. 1). A chamber 65 is formed in the stator between the inlet and discharge passages, and in continuous fluid communication therewith, and the outlet end of the discharge passage communicates with the passage 35 in the stator leading to the raw water inlet of the treatment tank 10. The proportioning apparatus also includes a raw water outlet passage 66 adapted for connection to the conduit 16 leading to the brine tank, and a brine inlet passage 67 adapted for connection to the conduit 17.

The flow proportioning apparatus is operatively connected to the valve so that in the service, backwash and rinse positions of the rotor, the fluid pressure conditions at the inlet chamber 63 and at the outlet end of the discharge passage 62 are substantially the same, whereby no flow occurs through the proportioning apparatus. Since the proportioning apparatus affords free fluid communication between the raw water outlet passage 66 and the brine inlet passage 67, the fluid pressures in the conduits 16 and 17 are substantially equalized under these conditions and no flow occurs through the brine tank. In the brining position of the rotor, fluid flows through the proportioning apparatus and produces a pressure drop between the raw water outlet 66 and the brine inlet 67 whereby raw water passes into the brine tank and the saturated brine from the brine tank flows to the proportioning apparatus to be mixed with the water flowing therethrough and carried therewith to the top of the treatment tank 10.

In the flow proportioning apparatus illustrated in the embodiment of Figs. 1–4, the inlet passage 61 is shaped in the form of a nozzle and a discharge passage 62 is shaped in the form of a throat having a flow area greater than the flow area of the nozzle 61, to thereby form an ejector. In this embodiment of the invention, the raw water outlet passage 66 communicates with the inlet chamber 63 and the brine inlet 67 communicates with the chamber 65, as is clearly shown in Fig. 3. The rotor of the multiport valve is arranged to block flow through the port 64, in the service and backwash positions of the rotor, to thereby prevent the flow of water through the proportioning apparatus. Since the inlet and discharge passages 61 and 62 provide continuous fluid communication between the conduits 16 and 17 leading to the brine tank, the fluid pressures at these conduits will be substantially equalized under these conditions whereby no flow occurs through the brine tank. The rotor is arranged to pass fluid through the port 64, when the rotor is in its brine position, and for this purpose is provided with a port 68 arranged to communicate with the port 64 in the stator, when the rotor is in its brine position. In this position of the rotor, the rotor blocks flow through the ports 45 and 46 so that the pressure at the outlet end of the discharge passage 62 is less than the pressure in the inlet chamber 63 whereby water flows through the ejector, a portion of the water being diverted through the conduit 16 and brine tank 14 for passage through the brine outlet conduit 17 into the chamber 65 wherein it mixes with the water flowing through the ejector and is carried therewith to the top of the treatment tank 10. In this manner raw water is mixed with the satuarted brine flowing from the tank to provide the desired concentration of brining solution. As is apparent the flow areas of the nozzle 61 and throat 62 may be proportioned so as to produce any desired rate of flow and ratio of water and saturated brine. A port 70 is provided in the rotor to pass untreated water to service during the brining phase of the regeneration cycle.

The rotor is adapted to be turned 90° from the brine position to its rinse position. In this position, the port 68 in the rotor communicates with the port 45 in the stator to pass raw water from the supply line to the top of the treatment tank and effect rinsing of the same. The radial drain passage 57 in the rotor communicates with the port 48 in the stator to pass the effluent from the treatment tank to drain. In order to prevent the flow of brine from the brine tank, during the rinse phase of the regeneration cycle, it is necessary to prevent flow through the proportioning apparatus. In the specific port and passage arrangement illustrated, the rotor port 53 communicates with the stator ports 64, when the rotor is in its rinse position, so that fluid at substantially line pressure is supplied to the inlet chamber 63 of the flow proportioning apparatus. In accordance with the present invention, the stator port 48 is restricted to provide the desired rate of flow of water during rinse and is made relatively smaller than the port 68 in the rotor so that the water from the supply line may flow through the port 45 at a rate appreciably in excess of the rate of flow of water through the stator port 48. Consequently, the treatment tank 10 and the conduit 11 are maintained at substantially line pressure during the rinse phase of the regeneration cycle whereby the pressure at the outlet end of the discharge passage 62 is substantially the same as the pressure in the inlet chamber 63 of the flow proportioning apparatus whereby no flow occurs through the proportioning apparatus. Under these conditions, the fluid pressures in the conduits 16 and 17 are substantially equalized so that no flow occurs through the brine tank. In order to provide flow to service, during the rinse phase of the regeneration cycle, there is provided a port 69 in the rotor which is arranged for communication with the service port 49, when the rotor is in its rinse position.

In the service position of the rotor, the port 64 communicating with the inlet of the flow proportioning apparatus is blocked so that no water flows therethrough. The ports 53 and 54, respectively, register with the ports 45 and 46 in the stator and the circumferential passage 55 in the rotor registers with the ports 47 and 49 in the stator to pass the treated effluent from the treatment tank to the service line 42. The conduits 16 and 17 leading to the brine tank are thus in continuous communication with each other and with the conduit 11 leading to the treatment tank 10. The pressures in the conduits 16 and 17 will, therefore, be substantially equalized so that no flow will tend to occur through the brine tank 14.

However, the fluid in the brine tank contains some air and will, consequently, tend to expand and contract as the pressure on the brine tank is respectively lowered and raised, as repeatedly occurs when the service line valve is opened and closed during use. In order to prevent the pumping of saturated brine from the brine tank, under these conditions, a valve 71 is provided in the brine outlet conduit 17. The valve 71 is normally closed and is arranged to open to permit brine to flow from the brine tank 14 through the conduit 17 only when the pressure on opposite sides of the valve 71 exceeds a preselected relatively low value of the order of 3 to 5 pounds per square inch.

A specific form of valve is illustrated in Figs. 8 and 9 and includes a body 72 having threaded ends adapted for connection to the brine outlet conduit 17. The body has a stepped flow passage 73 formed therein and a resilient disk 74 is seated in the stepped flow passage and extends thereacross, the disk being retained in position by means of a perforate washer 75. The resilient disk 74 has one or more slits 76 formed therein and arranged to open to permit fluid to pass thereby when the pressure on one side of the disk exceeds the pressure at the other side by a preselected amount such as 3 to 5 p.s.i.

The valve 71 thus prevents the flow of saturated brine through the brine line 17, when the pressure at the raw water inlet line 16 and the brine line 17 are substantially equal. The expansion and contraction of the fluid in the brine tank 14, therefore, effects flow only through the raw water inlet line 16 at the top of the tank. However, since the brine solution is heavier than water, the brine in the tank does mix appreciably with the water adjacent the top thereof so that the relatively small quantity of water which flows into and out of the raw water inlet line 16, during service, does not contain any appreciable quantity of brine.

The brine tank 14 is arranged to store a relatively large quantity of salt sufficient to permit a number of regenerations. In order to facilitate the determination of when the salt in the brine tank needs to be replenished, there is provided a brine indicator 78 also located in the concentrated brine line 17 and preferably at a level adjacent the lower end of the brine tank 14. The brine indicator may be of any suitable construction and is herein shown in the form of a transparent cup 79 which communicates with the concentrated brine line 17 and has a float member 81 disposed therein and having a buoyancy such as to float in the concentrated brine solution and to sink when the brine solution falls below a preselected concentration to thereby indicate, by its position in the cup, the concentration of the brine solution produced in the brine tank. Conveniently, the float 81 may be formed of a material such as nylon having a specific gravity only slightly greater than unity so as to float in a concentrated brine solution and to sink when the brine solution becomes diluted.

In order to facilitate refilling of the brine tank 14 with salt, there are provided a plurality of valves designated 82–84 and respectively arranged to cut off the flow through the raw water inlet conduit 16, the brine outlet conduit 17 and the drain conduit 85. When refilling the brine tank, the valves 82 and 83 are closed, and the valve 84 opened. The top of the tank 15 is then removed to permit the water to drain from the brine tank 14. The valve 84 is then closed and the tank filled with salt, after which the valve 82 is opened sufficient to permit the tank to be filled with water. Valve 82 is then closed, the cover 15 put on, and the valves 82 and 83 reopened. During the normal regeneration, the valves 82, 83 and 84 are not manipulated.

Since an ejector is utilized for a flow divider, the ejector may also be used to drain the brine tank 14 for refilling the same with salt. This is of particular advantage in those installations which do not have a drain at a level below the bottom of the brine tank such that the brine tank can drain, by gravity. Under these conditions, it is only necessary to close the valve 82, remove the cover 15 from the brine tank and then move the multiport valve rotor to its brine position to thereby withdraw the water from the brine tank for refilling the same with salt.

From the foregoing it is thought that the operation of the control system will be readily understood. The multiport valve is arranged to be stepped from its service position, through the backwash, brining and rinse positions and back to the service position at time intervals corresponding to the respective phases of the regeneration cycle. Conveniently, the valve may be time controlled by means of a timer 86 which is operatively connected to the solenoid 87 to periodically energize the latter and effect opening and closing of the valve 32 to thereby step the multiport valve between its successive positions.

In the service position of the rotor, fluid at line pressure is passed through ports 45 and 46 in the stator to the top of the treatment tank 10, the fluid from the bottom of the treatment tank 10 flowing through port 47, circumferenial passage 55 in the rotor and out through port 49 to service. The rotor blocks the ports 48 and 64 in the service position thereof so that no flow occurs through the proportioning device. Since the conduits 16 and 17 communicate with each other and with the conduit 11 leading to the top of the treatment tank, it is apparent that the pressure in the brine tank 14 is maintained at substantially the pressure in the conduit 11 so that no flow occurs through the brine tank.

In the backwash position of the rotor, fluid under line pressure is supplied to port 47 and into the bottom of the treatment tank 10, the port 46 in the stator being connected through the radial drain passage 57 in the rotor to the central drain passage 43. The port 64 in the stator is also blocked, in the backwash position of the rotor, so that no flow occurs through the porportioning apparatus. Since the port 47 is communicated to drain, the pressure in the line 11 leading to the treatment tank, and in the lines 16 and 17 leading to the brine tank will be at substantially drain pressure.

In the brine injection position of the rotor, the ports 45 and 46 are blocked and the port 68 in the rotor registers with the port 64 in the stator to thereby pass fluid to the inlet chamber of the flow proportioning apparatus 60. A portion of the water flowing through the port 64 passes through the conduit 16 to the brine tank, the remaining portion of the fluid flowing through the ejector nozzle to thereby draw the brine from the brine tank and carry the mixture of brine and water to the treatment tank 10.

In the rinse position of the multiport valve, the port 53 in the rotor registers with the port 64 in the stator so that fluid under line pressure is passed to the inlet chamber 63 of the flow proportioning apparatus. However, the port 48 in the stator is restricted so as to maintain the pressure in the conduit 11 at substantially line pressure, whereby to prevent flow of fluid through the proportioning apparatus.

It is also to be noted that the flow proportioning apparatus is operative to prevent flow through the brine tank while the valve rotor 21 is raised during movement between successive positions. Under these conditions both the port 64 and the ports 45 and 46 are uncovered so that line pressure is supplied to both the inlet chamber 63 and to the discharge end of the outlet passage. Therefore, no flow will occur through the proportioning apparatus and the pressures in the conduits 16 and 17 will be equal to line pressure.

The flow control apparatus illustrated in Figs. 5–7 is similar to that shown in Figs. 1–4, and like numerals are utilized to designate the same parts in the several views. As in the preceding embodiment, the stator 19 of the multiport valve includes passages 35 and 37, respectively, connected to the conduits 11 and 12 leading to the treatment tank 10; a passage 41 connected to the service conduit 42 and a central drain passage 43 connected to the drain conduit 44. A raw water inlet conduit 28 communicates with the chamber above the stator.

The embodiment of Figs. 5–7 differs from the preceding embodiment primarily in the specific form of flow proportioning apparatus provided and the slightly different connections to the brine tank necessitated by the difference in the flow proportioning apparatus. The flow proportioning apparatus, as shown in Fig. 7, includes an inlet passage 61a and a discharge passage 62a. An inlet chamber 63a is formed in the stator in communication with the inlet end of the passage 61a and a chamber 65a is formed in the stator between the inlet and discharge passages. In this embodiment, the inlet passage 61a is formed with a flow area greater than the flow area of the discharge passage 62a. Consequently, when water flows through the proportioning apparatus, the pressure in the chamber 65a will be higher than the pressure at the outlet end of the discharge 62a. According, the conduit 16 leading to the top of the treatment tank is arranged for connection to a passage 67a communicating with the chamber 65a. The saturated brine outlet conduit 17, leading from the bottom of the treatment tank, is connected to the flow proportioning apparatus adjacent the outlet end of the discharge passage 62a. As best shown in Fig. 5, the conduit 17 is connected, as by a T-fitting 90, to the passage 35 leading to the top of the treatment tank.

The rotor 21, as in the preceding embodiment, includes ports 53 and 54 arranged to register with the ports 45 and 46 in the stator, when the rotor is in its service position, to pass untreated water to the top of the treatment tank. The rotor is also formed with a circumferentially extending passage 55 arranged to communicate the ports 47 and 49 in the stator and to pass the treated water to service. In the service position of the rotor, the port 64a in the stator is blocked by the rotor.

In the backwash position of the rotor, the port 54 in the rotor communicates with the port 47 in the stator to pass untreated water to the bottom of the treatment tank 10. The radial passage 57 in the rotor communicates the port 46 in the stator with the central drain passage 43 to thereby pass the effluent from the top of the treatment tank to drain. As in the preceding embodiment, the port 64a in the stator is blocked during the backwash phase of the regeneration cycle to prevent the flow of water through the proportioning apparatus.

A port 68a is formed in the rotor and arranged to communicate with the port 64a in the stator only in the brine position of the rotor, to pass untreated water into the chamber 63a of the flow proportioning apparatus. In the brine position of the rotor, the radial passage 57 communicates with the port 47a to pass the effluent from the treatment tank to drain. A by-pass port 70 is provided in the rotor and arranged to communicate with the port 49 in the stator to pass water to service during this phase of the regeneration cycle. In this position of the rotor, the ports 45 and 46 are blocked by the rotor whereby fluid from the inlet chamber 63a of the flow proportioning apparatus flows through the passages 61a and 62a to the top of the treatment tank. Since the passage 61a is larger than the passage 62a, a portion of the water flowing through the former passage is diverted through the brine tank 14, and saturated brine passes from the brine tank through conduit 17 to the T-connection 90. The rotor is movable through substantially 90° from the brine position to its rinse position. In this embodiment of the invention, the rotor is arranged to block the port 64a leading to the flow proportioning apparatus, so as to thereby prevent the flow of fluid therethrough. A port 68b having a flow area sufficient to provide the desired backwash rate is provided in the rotor and arranged to communicate with the port 45 therein to pass fluid into the top of the treatment tank 10 to effect rinsing thereof. The radial passage 57 in the rotor communicates with the passage 48a in the stator, to pass the effluent from the treatment tank to drain. Since the flow to the proportioning apparatus is cut off during the rinse phase of the regeneration cycle, it is apparent that it is unnecessary to restrict the port 48a to maintain the tank 10 and line 11 at line pressure, as in the preceding embodiment. Accordingly, the desired rinse rate may be achieved by restricting the port 68b.

As in the preceding embodiment, a check valve 71 and indicator 79 are provided in the concentrated brine line 17 and valves 82—84 and drain conduit 85 are provided to permit draining the brine tank.

The operation of the control system of Figs. 5–7, during the service and backwash phases of the regeneration cycle is the same as in the control system of Figs. 1–4. In the brining phase of the regeneration cycle, the pressure in the chamber 65a is greater than the pressure at the outlet end of the discharge passage whereby a portion of the water flowing through the nozzle 61a is diverted through the brine tank 14 and the saturated brine flowing therefrom is mixed, at the T-connection 90 with the water flowing from the discharge passage. In the rinse position, the port 64a is blocked so that no flow occurs through the proportioning apparatus.

I claim:

1. A water softener control system for controlling the various flows to and from a treatment tank comprising, a multiport valve including a stator, a rotor cooperable with said stator for controlling the flow of fluid therethrough and movable between service, backwash, brining and rinse positions, a water supply line communicating with said valve, said stator having a first port adapted for connection to the hard water inlet of the treatment tank and a second port adapted for connection to the treated water outlet of the treatment tank, a third port in said stator, a sealed brine tank having a water inlet conduit communicating therewith adjacent the top of the tank and a brine outlet conduit communicating therewith below the top of the tank, a flow proportioning apparatus in said stator including a raw water inlet in continuous communication with said third port; a mixed brine and water outlet in continuous communication with said first port; a water outlet connected to said water inlet conduit leading to the brine tank; and a brine inlet connected to the brine outlet conduit, passage means in said apparatus providing open communication between each of said inlets and outlets of said apparatus to substantially equalize the pressures thereat in the absence of flow from said inlet to said outlet and operative in response to the flow of water from said third port through said inlet to said mixed outlet of said apparatus for effecting flow of a predetermined portion of the water flowing through said third port to said raw water outlet, said rotor including passage means operative to supply fluid from said supply line to said first port whereby to apply fluid at line pressure to said mixed outlet and prevent the flow of brine from said brine tank, valve means in said brine outlet conduit operative to open in response to a predetermined pressure differential thereacross and to close when the pressure differential is less than said predetermined value to thereby prevent the flow of brine through said brine outlet conduit due to fluctuations in pressure in said supply line, said rotor including passage means operative in the brining position thereof to supply water from said supply line to said third port, and means on said rotor operative in said brining position thereof to block the flow of water through said first port whereby to effect the flow of water from said third port through said proportioning apparatus.

2. The combination of claim 1 including a restricted passage in said rotor operative in the rinse position thereof to supply a restricted flow of water from said supply line to said first port, and means on said rotor operable in the rinse position thereof to block the flow of water from said supply line to said third port to thereby prevent the flow of brine to said mixed outlet.

3. The combination of claim 1 wherein said rotor is arranged to be lifted away from said stator, turned to a succeeding position and reseated on said stator, said flow control apparatus being operative to equalize the pressures at the water inlet conduit and the brine outlet conduit when the rotor is moved away from the stator to prevent flow through the brine tank under these conditions.

4. The combination of claim 1 including passage means in said rotor operative in the rinse position thereof to supply water at line pressure to said first port, said second port in said stator having a flow area smaller than said first port to thereby maintain the pressure in said treatment tank and at said first port at substantially line pressure to prevent the flow of water through said proportioning apparatus.

5. The combination of claim 4 wherein said stator has a fourth port having a flow area larger than said second port adapted for connection to the treated water outlet of a treatment tank, said rotor including means operative in the backwash position thereof for passing water through said fourth port.

6. A water softener control system for controlling the various flows to and from a treatment tank comprising, a multiport valve including a ported stator, a rotor cooperable with said stator for controlling the flows of fluid therethrough and movable between service, backwash, brining and rinse positions, a water supply line communicating with said valve, said stator having a first port adapted for connection to the hard water inlet of the treatment tank and a second port adapted for connection to the treated water outlet of the treatment tank, a third port in said stator, a sealed brine tank having a water inlet conduit communicating therewith adjacent the top thereof and a brine outlet conduit communicating therewith below the top thereof, an ejector in said stator including a throat having the discharge end thereof in continuous communication with said first port, a nozzle having the inlet end thereof in continuous communication with said third port, said injector including a brine inlet passage communicating with said throat and connected to said brine outlet conduit, a raw water outlet passage communicating with the third port and connected to said water inlet conduit, said nozzle having a discharge opening smaller than said throat to produce a pressure differential between said water outlet passage and said brine inlet passage when the fluid pressure at the discharge end of the throat is less than the pressure at the inlet of said nozzle, said nozzle and throat of said ejector providing continuous communication between said raw water outlet passage, said brine inlet passage and said third port to thereby substantially equalize the pressure therebetween when the pressure at the discharge end of the throat is equal to or greater than the pressure at the inlet of said nozzle, said rotor including passage means operative in the service position thereof for applying fluid at line pressure to said third port to thereby equalize the pressures at said water outlet passage and said brine inlet passage and prevent flow through the brine tank, valve means in said brine outlet conduit operative to open in response to a predetermined pressure differential thereacross and to close when the pressure differential is less than said predetermined value to thereby prevent the flow of brine through said brine outlet conduit in response to fluctuations in pressure in the supply line, said rotor including passage means operative in the brine position thereof to supply water at line pressure to said third port, and means on the rotor operative in the brine position thereof for blocking flow through said first port.

7. A water softener control system for controlling the various flows to and from a treatment tank comprising, a multiport valve including a ported stator, a rotor cooperable with said stator for controlling the flows of fluid therethrough and movable between service, backwash, brining and rinse positions, a water supply line communicating with said valve, said stator having a first port adapted for connection to the hard water inlet of the treatment tank and a second port adapted for connection to the treated water outlet of the treatment tank, a third port in said stator, a sealed brine tank having a water inlet conduit communicating therewith adjacent the top thereof and a brine outlet conduit communicating therewith below the top thereof, a flow divider in said stator including a discharge passage communicating with said first port and an inlet passage communicating with said third port, a water outlet passage communicating with said flow divider between said inlet and discharge passages and connected to said water inlet conduit, means connecting said brine outlet conduit to said valve in open communication with said first port, said inlet passage having a flow area greater than said discharge passage whereby a portion of the water flowing through said inlet passage passes through said water outlet passage to the brine tank, valve means in said brine outlet conduit operative to open in response to a predetermined pressure differential thereacross, said rotor including passage means operative in the service position thereof to supply fluid at line pressure to said first port, said inlet and discharge passages providing continuous communication between said first port and said water outlet and brine inlet conduits to thereby substantially equalize the pressures on opposite sides of said valve means when the pressure at said third port is equal to or greater than the pressure at said inlet passage, said rotor including means operative in the brining position thereof to block flow through said first port and establish flow through said third port.

8. A water softening apparatus comprising a treatment tank having a raw water inlet and a treated water outlet, a sealed brine tank having a water inlet and a brine outlet, a flow proportioning apparatus including a flow restrictor and having a raw water inlet and a raw water outlet at one side of said restrictor and a brine inlet and a mixed water and brine outlet at the other side of said restrictor, a first conduit means communicating said raw water outlet of the proportioning device to the inlet of the brine tank, a second conduit means communicating the brine outlet of the brine tank with the brine inlet of the proportioning device, a third conduit means providing continuous open communication between the mixed outlet of the proportioning device and the water inlet of the treatment tank, valve means connected to a raw water supply line and to said raw water inlet and said mixed brine and water outlet of said proportioning device for selectively controlling the flows of raw water thereto, said valve means including means operative during service to supply raw water to said mixed outlet for flow through said third conduit means to said inlet of said treatment tank, said proportioning device providing continuous fluid communication between said mixed outlet and said brine inlet and said raw water outlet to substantially equalize the pressures thereat when raw water is supplied to said mixed outlet, a pressure operated valve in said second conduit operative to open and permit flow from the brine tank only in response to a predetermined pressure differential thereacross whereby to prevent the flow of brine through said second conduit due to expansion and contraction in the volume of liquid in the brine tank with changes in pressure thereon, said valve means including means operative during brining to supply raw water to said raw water inlet of the proportioning device and to cut-off the flow of raw water to said mixed outlet whereby to pass a mixture of brine and water through said third conduit means to the treatment tank.

9. The combination of claim 8 wherein said valve means includes means operative during backwash to cut-off the flow to said raw water inlet of the proportioning device and to communicate said mixed outlet to drain to pass the effluent from the treatment tank, said proportioning device being operative to equalize the pressures at its raw water, its brine inlet and said mixed outlet when the supply of water to its water inlet is cut-off whereby to prevent flow through the brine tank.

References Cited in the file of this patent
UNITED STATES PATENTS

| | | |
|---|---|---|
| 2,042,781 | Grove | June 2, 1936 |
| 2,051,155 | Stoegemann | Aug. 18, 1936 |
| 2,243,815 | Griswold | May 27, 1941 |
| 2,670,328 | Webb | Feb. 23, 1954 |
| 2,738,807 | Addison | Mar. 20, 1956 |
| 2,744,867 | Webb | May 8, 1956 |
| 2,833,309 | Bird | May 6, 1958 |